United States Patent
Asai et al.

(10) Patent No.: US 7,103,678 B2
(45) Date of Patent: Sep. 5, 2006

(54) METHOD AND APPARATUS FOR DISTRIBUTING DIGITAL CONTENTS TO VARIOUS TERMINALS AND RECORDING MEDIUM CONTAINING SAME

(75) Inventors: Arito Asai, Saitama (JP); Hiroshi Suganuma, Saitama (JP); Norihisa Haneda, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1007 days.

(21) Appl. No.: 09/739,347

(22) Filed: Dec. 19, 2000

(65) Prior Publication Data

US 2001/0017885 A1    Aug. 30, 2001

(30) Foreign Application Priority Data

Dec. 20, 1999    (JP) .................................. 11-361721
Nov. 29, 2000    (JP) ............................ 2000-362807

(51) Int. Cl.
*G06F 15/16* (2006.01)
*H04L 9/00* (2006.01)

(52) U.S. Cl. ...................... 709/245; 375/220; 713/166
(58) Field of Classification Search ................ 709/201, 709/231, 232, 233, 246, 238, 249; 713/166, 713/154; 375/220
See application file for complete search history.

(56) References Cited

U.S. PATENT DOCUMENTS

| | | | | |
|---|---|---|---|---|
| 5,493,692 A | * | 2/1996 | Theimer et al. | ........... 455/26.1 |
| 5,603,058 A | * | 2/1997 | Belknap et al. | ............... 710/35 |
| 5,630,060 A | * | 5/1997 | Tang et al. | .................. 709/238 |
| 5,745,758 A | * | 4/1998 | Shaw et al. | .................. 718/102 |
| 5,809,139 A | * | 9/1998 | Girod et al. | ................. 380/202 |
| 5,838,927 A | * | 11/1998 | Gillon et al. | ................ 709/247 |
| 6,003,065 A | * | 12/1999 | Yan et al. | .................... 709/201 |
| 6,091,777 A | * | 7/2000 | Guetz et al. | ........... 375/240.11 |
| 6,154,839 A | * | 11/2000 | Arrow et al. | ................ 713/154 |
| 6,170,057 B1 | * | 1/2001 | Inoue et al. | ................. 713/153 |
| 6,195,677 B1 | * | 2/2001 | Utsumi | ....................... 709/201 |
| 6,598,161 B1 | * | 7/2003 | Kluttz et al. | ............. 713/166 |
| 7,010,681 B1 | * | 3/2006 | Fletcher et al. | ............. 713/154 |
| 2003/0105925 A1 | * | 6/2003 | Yoshimura et al. | ......... 711/118 |
| 2004/0172376 A1 | * | 9/2004 | Kobori et al. | .................. 707/1 |

FOREIGN PATENT DOCUMENTS

JP    9-18468    1/1997

OTHER PUBLICATIONS

James Goodman, et al. "Low power scalable encryption for wireless systems." Wireless Networks 4 (1998): 55-70.*

* cited by examiner

*Primary Examiner*—Krisna Lim
*Assistant Examiner*—Philip Chea
(74) *Attorney, Agent, or Firm*—McGinn IP Law Group, PLLC

(57) ABSTRACT

A contents distribution apparatus for distributing distribution data, which is converted by a method according to the difference of addressee terminal, is provided. A distribution apparatus 90 for distributing digital contents to an addressee terminal, which includes a contents storage unit 20 for storing digital contents, a data receiving unit 70 for receiving the type of an addressee terminal from a different requester than an addressee which requests to distribute digital contents, a converting unit 40 for converting digital contents into distribution data based on the type, and a distribution unit for connecting to an addressee terminal in a condition that the converting unit 40 has completed converting to distribution data and for distributing the distribution data to an addressee terminal.

29 Claims, 8 Drawing Sheets

| TERMINAL TYPE | PATH | COMPUTATIONAL POWER | REDISTRIBUTION POWER | CREDIBILITY | USABLE DATA | CODING ID |
|---|---|---|---|---|---|---|
| COMPUTER (CABLE) | WAN | HIGH | HIGH | HIGH | JPEG·GIF··· | A3 |
| | " | " | " | FAIR | " | A1 |
| | " | " | " | LOW | " | A1 |
| | LAN | " | " | HIGH | " | A3 |
| COMPUTER (INFRARED-WIRELESS) | WAN | " | " | HIGH | | A1 |
| | LAN | " | " | | | A1 |
| STOREFRONT TERMINAL | WAN | LOW | FAIR | | | A3 |
| | LAN | " | " | | | A5 |
| PORTABLE TERMINAL | WAN | " | HIGH | | | A3 |
| CELL PHONE | SWITCHBOARD VIA WAN | " | " | | | A6 |
| | SWITCHBOARD VIA LAN | " | " | | | A5 |
| GAME MACHINE | WAN | FAIR | LOW | | | A4 |
| | LAN | " | " | | | A6 |
| SATELLITE TERMINAL | SATELLITE COMMUNICATION | HIGH | HIGH | | | A1 |

FIG. 3

| ADDRESSEE ID | SPECIFIC DATA | | | |
|---|---|---|---|---|
| | CODING FORMAT | DIGITAL SIGNATURE | SPECIFIC HARDWARE DATA | SPECIFIC SOFTWARE DATA |
| | | | | |
| | | | | |
| | | | | |

FIG. 4

| ADDRESSE ID | ENCRYPTION | ENCRYPTION INTENSITY | DIGITAL WATERMARKING |
|---|---|---|---|
| A1 | A | L | YES |
| A2 | ″ | ″ | NO |
| A3 | ″ | M | YES |
| A4 | ″ | ″ | NO |
| A5 | ″ | S | YES |
| A6 | ″ | ″ | NO |
| B1 | B | L | YES |
| B2 | ″ | ″ | NO |
| ⋮ | | | |

FIG. 5

METHOD AND APPARATUS FOR DISTRIBUTING DIGITAL CONTENTS TO VARIOUS TERMINALS AND RECORDING MEDIUM CONTAINING SAME

This patent application claims priority from a Japanese patent applications No. H11-361721 filed on Dec. 20, 1999 and No. 2000-362807 filed on Nov. 29, 2000, the contents of which are incorporated herein by reference.

BACKGROUND OF THE INVENTION

1. Field of the Invention

The present invention relates to an apparatus for distributing contents. In particular, the present invention relates to an apparatus for distributing contents, which distributes distribution data that is created by converting digital data by different methods depending on the data of an addressee terminal.

2. Description of the Related Art

Conventionally, it is widely known that an art for encoding data in order not to refer to other than a desired addressee terminal when digital data (hereinafter referred to as "digital contents"), such as text data, image data, audio data, or program data, is distributed via a communication network. According to the advances in information and communication technologies, digital contents are becoming easier to handle with various equipments, such as cellular phones, Personal Handyphone Systems or PHSs, game machines, or television receivers, as well as computers. However, these communication equipments greatly differ from one another in networking securities and an ability to decode coded data. In order to cope with these various applications in communication technologies, the Japanese Patent Application Laid-Open No. H09-18468 discloses an art to encode data by a format depending on an addressee terminal.

However, the conventional art disclosed in the above patent application requires a format selection of encryption at the time of starting communication. Therefore, the operation of authentication has to be undertaken at every communication. This operation can be an annoyance. Also, since a format of encryption is selected based on data from an addressee terminal, communication security is not always confirmed. Further, since digital contents are easily redistributed because of their nature, it is desired that the digital contents is prevented appropriately from being distributed from an addressee terminal to another. Furthermore, since there are various formats for image data and text data, it is bothersome for an addressee terminal to select an appropriate format at the time of starting communication.

SUMMARY OF THE INVENTION

Therefore, it is an object of the present invention to provide a method and apparatus for distributing contents, which is capable of overcoming the above drawbacks accompanying the conventional art. This object is achieved by combinations described in the independent claims. The dependent claims define further advantageous and exemplary combinations of the present invention.

A distribution apparatus for distributing digital contents to an addressee terminal, which includes: a contents storage unit, which stores the digital contents; a data receiving unit, which receives a type of the addressee terminal from a different requester than the addressee terminal which requests to distribute the digital contents; a converting unit, which converts the digital contents into distribution data based on the type of the addressee terminal; and a distribution unit, which connects to the addressee terminal in a condition that the converting unit has completed converting the digital contents into the distribution data and distributes the distribution data to the addressee terminal.

The data receiving unit may receive the type of the addressee terminal from a provider of the digital contents.

The distribution apparatus may further include an addressee terminal data managing unit, which manages an appropriate format of distribution data for each addressee terminal, by matching with a plurality of the type of the addressee terminal and selects the appropriate format of the distribution data for the addressee terminal based on the type of the addressee terminal received by the data receiving unit, and the converting unit may convert the digital contents into the distribution data of the format selected by the addressee terminal data managing unit.

The addressee terminal data managing unit may manage an appropriate encryption for the addressee terminal with a format of the distribution data; and the converting unit may convert the digital contents into the distribution data of the encryption selected by the addressee terminal data managing unit.

The addressee terminal data managing unit may select the encryption which can be decoded at the addressee terminal.

The data receiving unit may receive from the requester, path data relating to a distribution path to the addressee terminal; the addressee terminal data managing unit may manage data relating to the safety of the distribution path to the addressee terminal; and the converting unit may encrypt the digital contents with an intensity according to the safety.

The data receiving unit may receive from the requester, the path data relating to the distribution path to the addressee terminal; the addressee terminal data managing unit may select whether or not to embed a digital watermarking into the distribution data, based on the path data; and the converting unit may embed the digital watermarking into the distribution data when the addressee terminal data managing unit selects to embed the digital watermarking.

The data receiving unit may further receive identification data for identifying the addressee terminal from the requester; the addressee terminal data managing unit may further include an addressee terminal data table, which matches identification data for identifying the addressee terminal with the type of the addressee terminal; the data receiving unit may receive from the requester, the identification data of the addressee terminal and the type of the addressee terminal when the identification data is not stored in the addressee terminal data table; and the addressee terminal data table may store the type by matching with the identification data.

The addressee terminal data managing unit may detect a computational power of the addressee terminal based on the type of the addressee terminal received by the data receiving unit and may select the type based on the computational power.

The addressee terminal data managing unit may judge a data redistributing ability of the addressee terminal based on the type of the addressee terminal received by the data receiving unit and may select the type based on the data redistributing ability.

The addressee terminal data managing unit may manage data relating to the computational power of the addressee terminal terminal; and the converting unit may encrypt the digital contents with the intensity according to the computational power of the terminal.

The addressee terminal data managing unit may select the type based on a credibility of the addressee terminal.

The addressee terminal data managing unit may judge the data redistributing ability of the addressee terminal based on the type of the addressee terminal received by the data receiving unit and may further manage specific data, which is specific to the data redistributing ability of the addressee terminal; and the converting unit may embed the specific data into the distribution data according to the data redistributing ability of the addressee terminal.

The addressee terminal data managing unit may further manage specific data, which is specific to the credibility of the addressee terminal; and the converting unit may embed the specific data into the distribution data according to the credibility of the addressee terminal.

The addressee terminal data table may further store specific hardware data, which is specific to hardware of each addressee terminal; and the converting unit may embed the specific hardware data into the distribution data.

The addressee terminal data table may further store specific software data, which is specific to software of a program for viewing the digital contents on each addressee terminal; and the converting unit may embed the specific software data into the distribution data.

The addressee terminal data managing unit may select the type based on a data format, which is decoded by the addressee terminal.

A distribution method for distributing digital contents as distribution data of a certain format, which includes: judging and selecting addressee terminal data of an addressee terminal based on data previously received from the addressee terminal, the judging and selecting being initiated by a distributor; converting the digital contents into distribution data by a method based on the addressee terminal data; storing the distribution data differently for every addressee terminal; and distributing the distribution data stored for the addressee terminal to a desired addressee terminal.

A contents distribution method for distributing digital contents to an addressee terminal, which includes: receiving data of a type of the addressee terminal from a different requester than the addressee terminal, which requests to distribute the digital contents; converting the digital contents into distribution data based on the type; and connecting to the addressee terminal in a condition that converting to distribution data has completed distributing the distribution data and distributing the distribution data to the addressee terminal.

A recording medium for storing a program for a distribution apparatus to distribute digital contents to an addressee terminal, which includes: a data receiving module, which receives the type of the addressee terminal from a different requester than the addresser, which requests distribution of the digital contents; a converting module, which converts the digital contents into distribution data based on the type; and a distribution module, which connects to the addressee terminal in a condition that the converting module has completed converting the digital data into the distribution data and distributes the distribution data to the addressee terminal.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 3 is a diagram showing a data structure of a format selecting table.

FIG. 4 is a diagram showing a data structure of an addressee terminal data table.

FIG. 5 is a diagram showing a data structure of a coding format table.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

The word "format" described in the Claims corresponds to the phrase "coding format" described in the Detailed Description of the Invention.

Figure 1:
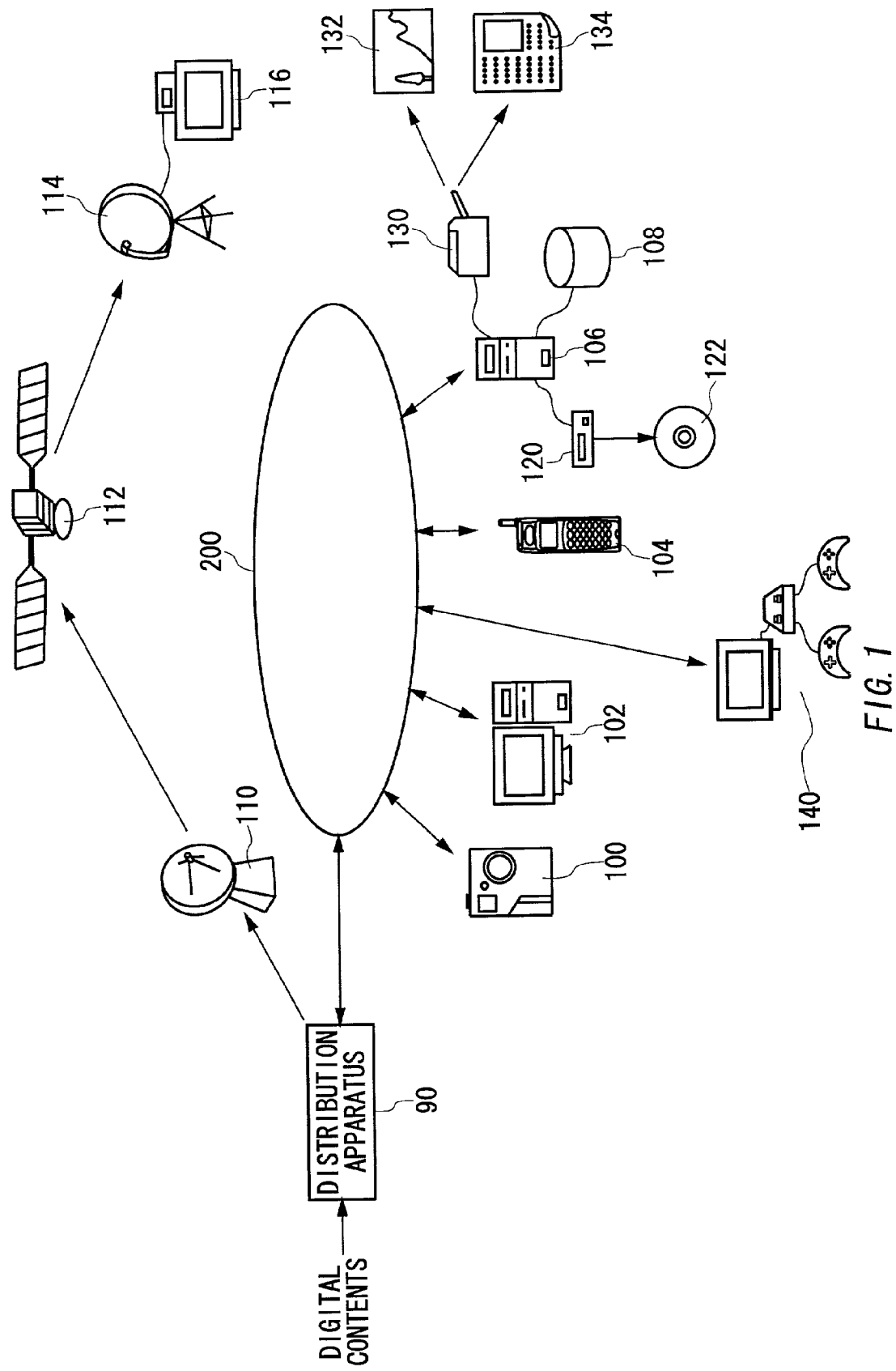
FIG. 1 is a diagram showing the entire system including a distribution apparatus.

FIG. 1 shows the entire system including a distribution apparatus 90 according to the first embodiment. The distribution apparatus 90 receives and stores digital contents. The distribution apparatus 90 selects a data format for distributing the digital contents, based on the type of addressee terminal designated as an addressee terminal of digital contents and a distribution path to an addressee terminal. The distribution apparatus 90 converts digital data into distribution data of a selected data format and transmits the converted data to an addressee terminal. Therefore, the distribution apparatus 90 transmits digital contents as distribution data, which is appropriate to each addressee terminal.

Each addressee terminal receives digital contents after decoding distribution data received from the distribution apparatus 90. An addressee terminal may be, for example, a digital camera 100, a computer 102, a cellular phone 104, a server 106, a satellite terminal 116, a game machine 140 or the like.

The distribution path where the distribution apparatus 90 distributes distribution data to each addressee terminal is a network 200: such as a WAN or Wide Area Network; or a LAN or Local Area Network. The distribution path through which the distribution apparatus 90 distributes distribution data to the satellite terminal 116 goes through a satellite transmitter 110, a communication satellite 112, and a satellite receiver 114. Digital contents include audio data, frame data, animation data, and text data, for example.

Each addressee terminal stores digital contents by means such as a semiconductor memory or an auxiliary storage of each addressee terminal and maintains the stored data. For example, the server 106 maintains the obtained digital contents as a database 108. For example, the server 106 may also store digital contents on a CD-ROM 122 using a CD-R drive 120.

Figure 2:
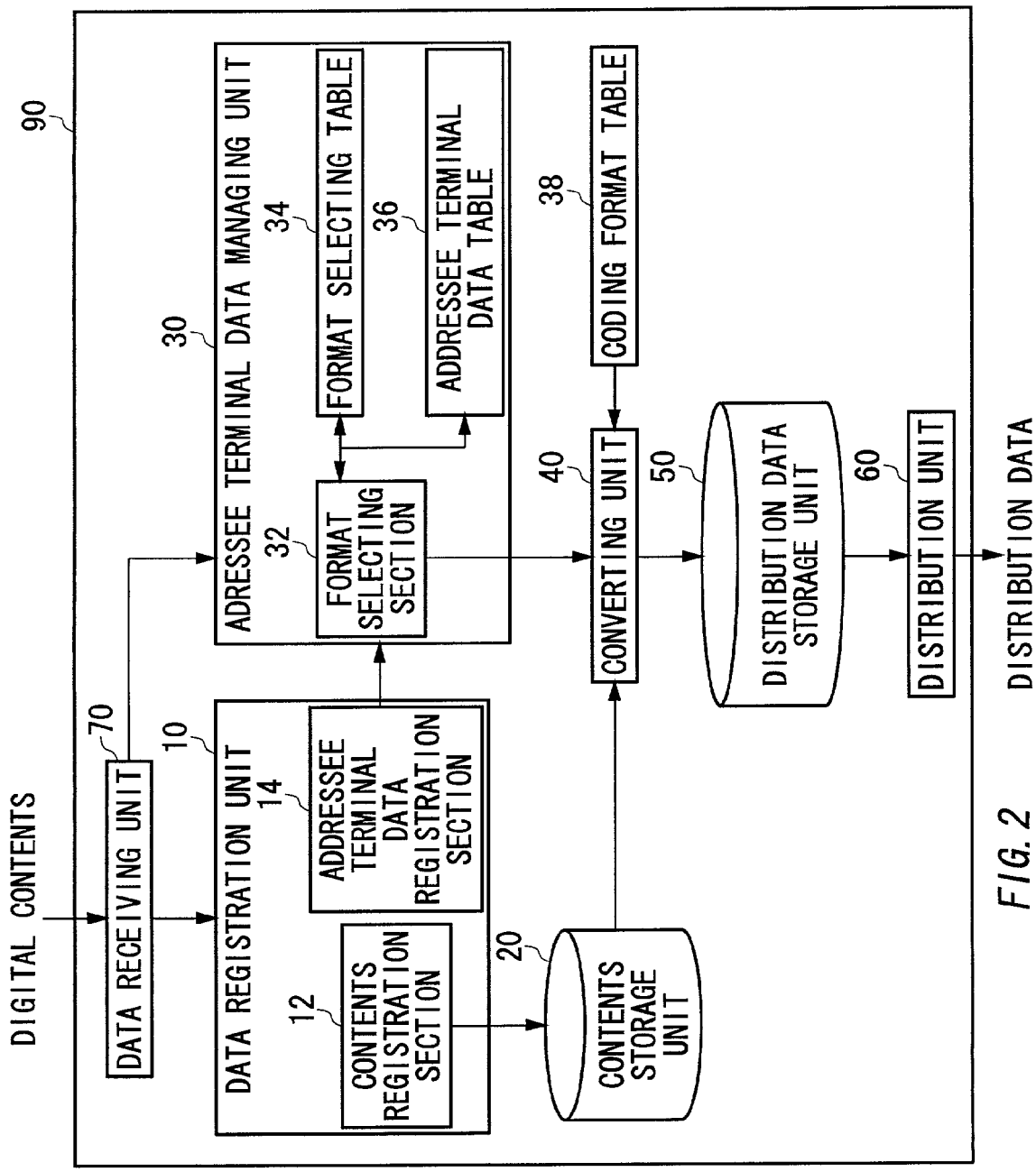
FIG. 2 is a functional block diagram showing the distribution apparatus.

FIG. 2 is a functional block diagram showing the distribution apparatus 90. A series of operations of the distribution apparatus 90 are achieved in cooperation with: mainly a CPU and a ROM disk; and a program stored on a RAM disk. However, other components may be used to compose the distribution apparatus 90. The flexibility of design is quite high. The distribution apparatus 90 includes a data receiving unit 70, a data registration unit 10, a contents storage unit 20, an addressee terminal data managing unit 30, a converting unit 40, a distribution data storage unit 50, a distribution unit 60, and a coding format table 38. The data registration unit 10 includes a contents registration section 12 and an addressee terminal data registration section 14. The addressee terminal data managing unit 30 includes a format selecting section 32, a format selecting table 34, and an addressee terminal data table 36.

The data receiving unit 70 receives digital contents and transmits the received digital contents to the contents registration section 12. The data receiving unit 70 also receives a request to distribute digital contents. The data receiving unit 70 further receives addressee terminal data regarding an addressee terminal, from a requester who requested to distribute digital contents. The addressee terminal data includes a type of addressee terminal, identification data for identifying an addressee terminal, and path data showing a distribution path to an addressee terminal.

The contents registration section 12 receives digital contents from the data receiving unit 70 and stores the received contents in the contents storage unit 20. The contents storage unit 20 stores the received contents. The contents storage unit 20 may be a mass storage device, such as a hard disk, a CD or Compact Disc, or a DVD or Digital Versatile Disc. The addressee terminal data registration section 14 receives addressee terminal data from the data receiving unit 70. The addressee terminal data registration section 14 checks the addressee terminal data table 36 if the addressee terminal data table 36 stores the identification data included in addressee terminal data. If the addressee terminal data table 36 does not have the identification data included in addressee terminal data, which the addressee terminal data registration section 14 received from the data receiving unit 70, the addressee terminal data registration section 14 stores the identification data in the addressee terminal data table 36.

The format selecting table 34 stores an appropriate coding format of distribution data for a respective addressee terminal, by corresponding the addressee terminal to a plurality of types of addressee terminals. A coding format is data that designates an encryption, an encryption intensity, and is either with or without a digital watermarking. The addressee terminal data table 36 stores identification data for identifying an addressee terminal, an appropriate coding format for an addressee terminal, and specific data. The specific data is data specific to hardware and software of an addressee terminal.

The format selecting section 32 selects an appropriate coding format for an addressee terminal by referring to the type of addressee terminal received from the data receiving unit 70 and the format selecting table 34. The format selecting section 32 stores the selected coding format in the format selecting table 34 by corresponding the format to identification data of an addressee terminal. The addressee terminal data managing unit 30 may be a mass storage device, such as a hard disk, a CD, or a DVD. The coding format table 38 stores encryption data matching with each coding format, an encryption intensity, and a digital watermarking, by corresponding them to a coding format.

The converting unit 40 receives: digital contents from the contents storage unit 20; and a coding format and specific data from the addressee terminal data managing unit 30. The converting unit 40 embeds specific data in digital contents. The converting unit 40 converts digital contents that embedded specific data into distribution data, by using a processing method such as an encryption stored in the coding format table 38 by corresponding digital contents to the received coding format. Therefore, the converting unit 40 can convert digital contents into distribution data with an appropriate coding format for a type of addressee terminal and a distribution path. The converting unit 40 also transmits the converted distribution data to the distribution data storage unit 50.

The distribution data storage unit 50 stores distribution data converted by the converting unit 40 by corresponding the distribution data to a coding format and digital contents of pre-converted distribution data. The distribution data storage unit 50 may be a mass storage device, such as a hard disk, a CD, or a DVD.

The distribution unit 60 receives distribution data from the distribution data storage unit 50. The distribution unit 60 gains access to an addressee terminal with a condition that the converting unit 40 has completed converting digital contents into distribution data. The distribution unit 60 then distributes distribution data to an addressee terminal. Therefore, since the authentication into the form that the data should be converted has already been undertaken when the distribution unit 60 transmits distribution data, the authentication process at the time of transmission can be simplified.

The distribution apparatus 90 may be constituted as a unit of apparatuses. The distribution apparatus 90 may also be constituted by a group of servers including at least a part of the distribution apparatus 90 as another server. Each server that constitutes the group of servers may be placed in remote places.

FIG. 3 shows a data structure of the format selecting table 34. The format selecting table 34 stores a preferable coding format by corresponding the format to a type of addressee terminal, a distribution path, computational power, redistribution power, credibility, and usable data. The format selecting table 34 includes an addressee terminal type field, a path data field, a computational power field, a redistribution power field, a credibility field, a usable data field, and a coding ID field. The addressee terminal type field stores data showing a type of addressee terminal, such as a computer, a storefront terminal, a portable terminal, a cellular phone, a game machine, or a satellite terminal.

The path data field stores data relating to a distribution path from the distribution apparatus 90, such as a WAN, a LAN, or a satellite communication, to an addressee terminal. The safety of distribution differs depending on the type of distribution path that is used when distribution data is distributed from the distribution apparatus 90 to an addressee terminal. For example, if distribution data goes through a LAN, which is a closed network, at least the possibility to be referred to distribution data from terminals other than terminals connected to the LAN is low. Thus, the safety of the distribution path can be considered high. For example, if distribution data goes through a WAN, which is a network among terminals at distant places and LANs, the possibility to be referred to distribution data from terminals other than an addressee terminal is high. Thus, the safety of the distribution path can be considered low.

Also, for example, if a network is wireless, such as a infrared communication, a radio communication, and a satellite communication, the safety of the distribution path can be considered low. Based on the judgment described above, the format selecting table 34 is arranged so that the higher the safety of a distribution path, the lower the degree of encryption. Therefore, the format selecting section 32 can select a coding format according to the distribution path to an addressee terminal.

The computational power field stores data relating to computational power of an addressee terminal. The computational power is, for example, an ability to decode coded distribution data. The computational power of an addressee terminal depends on software that decodes distribution data and hardware that runs the software, especially a CPU. For example, if an addressee terminal is a computer, the computational power is high. The format selecting table 34 is arranged to correspond to a coding format according to the computational power. The format selecting section 32 can select a coding format according to the computational power of an addressee terminal.

The redistribution power field stores data showing an ability for an addressee terminal to further distribute received distribution data to other terminals. The redistribution power is an ability for an addressee terminal to further distribute received digital contents to other terminals or to apply for a secondary use. The redistribution power depends mainly on the type of addressee terminal. For example, cellular phones and game machines are difficult to redistribute distribution data and to apply for a secondary use. On the other hand, computers are easier to redistribute distribution data and to apply for a secondary use. The embodiment of the redistribution and secondary use include not only to use digital contents on networks but also to redistribute in forms of: printed matters, which printed or recorded these digital contents; or a medium, such as a CD-ROM. A coding format is selected according to the redistribution power in the format selecting table 34.

The credibility field stores data relating to the credibility of an addressee terminal. The credibility is data that is judged based on the past communication records with an addressee terminal and the credibility data of an addressee terminal. The format selecting section 32 can select a coding format according to the credibility.

The usable data field stores the types of data, which can be used for addressee terminals. If digital contents are image data, the usable data field stores a format with which an addressee terminal can deal, such as JPEG or Joint Photographic Experts Group, GIF or Graphics Interchange Format, and TIFF or Tag Image File Format. Also, if digital data is image data, the usable data field stores: a resolution, such as 16 BASE and VGA or Video Graphics Array; and the number of colors, such as full color or 256 colors, with which an addressee terminal can deal. If digital contents are text data, the usable data field stores a code with which an addressee terminal can deal: such as a text code, such as ISO-8859-1 and Unicode; a Kanji Code, such as JIS or Japanese Industrial Standards and Shift JIS; and a linefeed code, such as CR and CR+LF. The coding ID field stores data showing a coding ID that designates a coding format.

Therefore, since the format selecting table 34 stores data relating to an addressee terminal and data relating to a distribution path, the format selecting section 32 can receive data relating to an addressee terminal and data relating to a distribution path from the data receiving unit 70. The format selecting section 32 can also select a coding format of distribution data that should be transmitted to an addressee terminal, by using the received data relating to an addressee terminal, the data relating to a distribution path, and the format selecting table 34.

As another example, the format selecting table 34 may store an encryption that is decodable for an addressee terminal. The encryption of text data may be a DES or Data Encryption Standard, which is a private key cryptosystem or a common key cryptosystem, and a public key cryptosystem, such as an RSA and an FS. As an encryption of image data and audio data, data may be scrambled. The encryption may be undertaken for all the digital contents and the partial digital contents. In this case, the format selecting table 34 stores the type of an addressee terminal by matching with a coding format including an encryption that is decodable for an addressee terminal. Thus, the format selecting section 32 can select a coding format including an encryption appropriate to an addressee terminal.

FIG. 4 shows a data structure of the addressee terminal data table 36. The addressee terminal data table 36 stores data relating to an addressee terminal by matching with identification data of an addressee terminal. The addressee terminal data table 36 includes an addressee terminal ID field, a coding format field, and a specific data field. The addressee terminal ID field stores identification data that identifies an addressee terminal. Examples of identification data include an e-mail address and a telephone number of an addressee terminal. The coding format field stores a coding ID of a coding format selected by the format selecting section 32.

The specific data field stores, for example: a digital signature of an addressee terminal; specific hardware data, which shows the hardware power of an addressee terminal; and specific software data, which is a program for viewing digital contents on an addressee terminal. The specific hardware data is an ID of such as a CPU of an addressee terminal, a network card, an MPEG decoder, and a CD-ROM drive. The specific software data is a software ID of a decoder program, such as MPEG and MP3. The specific data may store authors and owners of digital contents and data showing senders, which should be transmitted to the corresponding address.

Therefore, the addressee terminal data table 36 stores data relating to an addressee terminal by matching with identification data of an addressee terminal. When the format selecting section 32 receives a request for digital contents to be sent to an addressee terminal already stored in the addressee terminal data table 36, the format selecting section 32 can select a coding format from data relating to an addressee terminal stored in the addressee terminal data table 36. Also, since the addressee terminal data table 36 stores specific data by matching with identification data of an addressee terminal, the converting unit 40 can embed specific data that corresponds to an addressee terminal into distribution data to transmit to an addressee terminal. Further, since the addressee terminal data table 36 stores specific hardware data and specific software data, the converting unit 40 can notify an addressee terminal whether or not distribution data can be read at an addressee terminal.

FIG. 5 shows a data structure of the coding format table 38. The coding format table 38 includes an addressee terminal ID field, an encryption field, an encryption intensity field, and a digital watermarking field. The addressee terminal ID field stores a coding ID for identifying a coding format. The encryption field stores the type of encryption. As described above, since the encryption field stores a plurality of encryptions, the converting unit 40 can convert digital contents into distribution data of a coding format of encryption appropriate to an addressee terminal.

The encryption intensity field stores the degree of encryption intensity. As described above, since the encryption intensity field stores a plurality of encryption intensities, the converting unit 40 can convert digital data into distribution data of a coding format with an appropriate encryption intensity, matching with the distribution path to an addressee terminal. In order to intensify the encryption intensity, such an encryption algorithm that requires a great deal of calculated amount and calculated time to decode may be used, for example. In many cases, the intensity of an encryption is shown by the number of bits, which is the length of data of a cipher key needed for decoding. The digital watermarking field stores data showing if there is or is not a digital watermarking.

As described above, the coding format table 38 stores data relating to an encryption, an encryption intensity, and a digital watermarking, by matching with an addressee terminal ID. In this way, the coding format table 38 stores each coding ID by matching with the combinations of various encryptions, encryption intensities, and digital watermarkings. Thus, by receiving a coding ID from the format selecting section 32, the converting unit 40 can undertake the processes matching with the received ID and convert digital contents into distribution data. Also, since the distribution apparatus 90 includes the format selecting table 34 and the coding format table 38, the distribution apparatus 90 can effectively create distribution data.

By using the format selecting table 34 and the coding format table 38, a coding format that corresponds to the combinations of various addressee terminals and distribution paths as in the following can be selected.

If an addressee terminal is a computer, since computer power is relatively high: the encryption intensity is set high when the computer is connected to a WAN by a cable; and the encryption intensity is set fair when the computer is connected to a LAN by a cable. Since computers are easy for redistribution and secondary use of digital contents, a digital watermarking is embedded.

If an addressee terminal is a computer connected with infrared or is wireless, the encryption intensity is set high for both distribution paths via WAN and via LAN, considering that other terminals other than the object addressee terminal can receive distribution data. A digital watermarking is also embedded.

If an addressee terminal is a dedicated terminal placed at a storefront and the distribution path is via WAN, the encryption intensity is set fair and a digital water marking is embedded. If an addressee terminal is a dedicated terminal placed at a storefront and the distribution path is via LAN, the encryption intensity is set to zero and a digital watermarking is embedded. If an addressee terminal is a portable terminal, such as a PDA or Personal Digital Assistants, the encryption intensity is set fair and a digital watermarking is embedded since the distribution path is via WAN.

If an addressee terminal is a cellular phone, including a PHS, the decoding becomes difficult even for a correct addressee terminal if the encryption intensity is set high, since the computer power of the CPU of a cellular phone is not very high. Thus, when the distribution path is via WAN, the encryption intensity is set low. And when the distribution path is via LAN, the encryption intensity is set to zero. If the redistribution of digital contents by a cellular phone is difficult, a digital watermarking may not be embedded.

If an addressee terminal is a game machine, the encryption intensity is set fair when the distribution path is via WAN and low when the distribution path is via LAN, considering the computer power of the CPU. However, when data that requires to be in real time is distributed, the encryption intensity may be further lowered. If the redistribution of digital contents by a game machine is difficult, a digital watermarking may not be embedded.

If an addressee terminal is a satellite terminal, the encryption intensity is set high since many terminals other than the object addressee terminal can receive distribution data. A digital watermarking is embedded considering, for example, a recording of a video tape.

Figure 6:
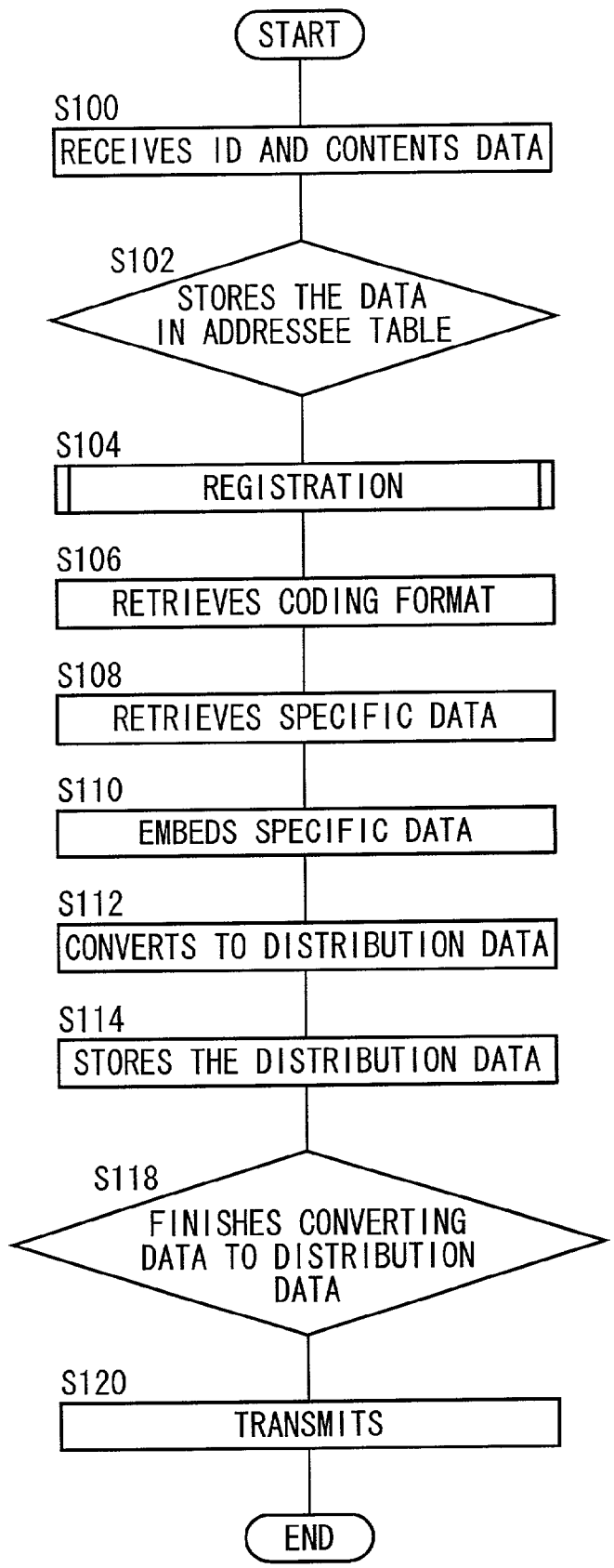
FIG. 6 is a flowchart showing the operations of the distribution apparatus to transmit distribution data.

FIG. 6 is a flowchart showing the operations of the distribution apparatus 90 to transmit distribution data. The data receiving unit 70 receives contents data that designates addressee terminal data and digital contents from a sender of digital contents, at step S100. If identification data included in the received addressee terminal data is not stored in the addressee terminal data table 36, at step S102, the addressee terminal data registration section 14 stores the identification data received by the data receiving unit 70 to the addressee terminal data table 36, at step S104. If identification data included in the received addressee terminal data is stored in the addressee terminal data table 36, at step S102, the operation jumps to step S106. The format selecting section 32 then retrieves a coding format matching with identification data received by the data receiving unit 70 from the format selecting table 34, at step S106. The format selecting section 32 then further retrieves specific data stored in the format selecting table 34 by matching with identification data, at step S108.

The converting unit 40 then embeds specific data received from the format selecting section 32 into digital contents, at step S110. Simultaneously, the converting unit 40 may embed specific data as a digital watermarking or may embed to be visible. Specific data may be embedded when the credibility of an addressee terminal is low. Specific data may also be embedded according to the ability of an addressee terminal to redistribute distribution data. As described above, the converting unit 40 can prevent terminals other than an addressee terminal from incorrect reference after distribution since the converting unit 40 embeds specific data into distribution data according to the credibility of an addressee terminal and the ability of an addressee terminal to redistribute distribution data.

The format selecting section 32 then transmits the retrieved coding format and specific data to the converting unit 40. The converting unit 40 receives the coding format and the contents data from the format selecting section 32. The converting unit 40 retrieves digital contents that contents data shows, from the contents storage unit 20. The converting unit 40 then converts the digital contents into distribution data of a coding format received from the format selecting section 32, at step S112.

Thus, since the converting unit 40 converts digital contents into distribution data of an encryption according to an addressee terminal, an illegal access made by terminals other than an addressee terminal can be prevented effectively and appropriately.

The converting unit 40 then stores the converted distribution data in the distribution data storage unit 50, by matching with the pre-converted digital contents, at step S114. When the converting unit 40 completes converting digital contents into distribution data, at step S118, the distribution unit 60 transmits the distribution data to an addressee terminal after passing through an access from an addressee terminal and an authentication, at step S120. The operations of the distribution apparatus 90 to transmit distribution data is completed with the above operations.

In this way, the distribution apparatus 90 receives a request to distribute digital contents from terminals other than an addressee terminal and gains access to an addressee terminal after previously converting digital contents into distribution data. Therefore, the distribution apparatus 90 can transmit distribution data to an addressee terminal at the same time as an access.

Since the distribution apparatus 90 stores digital contents by previously encrypting the digital contents, it is not necessary to encrypt at the time of distribution. Therefore, the distribution operation can become easier. Also, since the distribution apparatus 90 previously encrypts data according to the embodiment of an addressee terminal, there is no need to authenticate the method of encryption with each other at the time of distribution. Therefore, the authentication procedure can be simplified.

Figure 7:
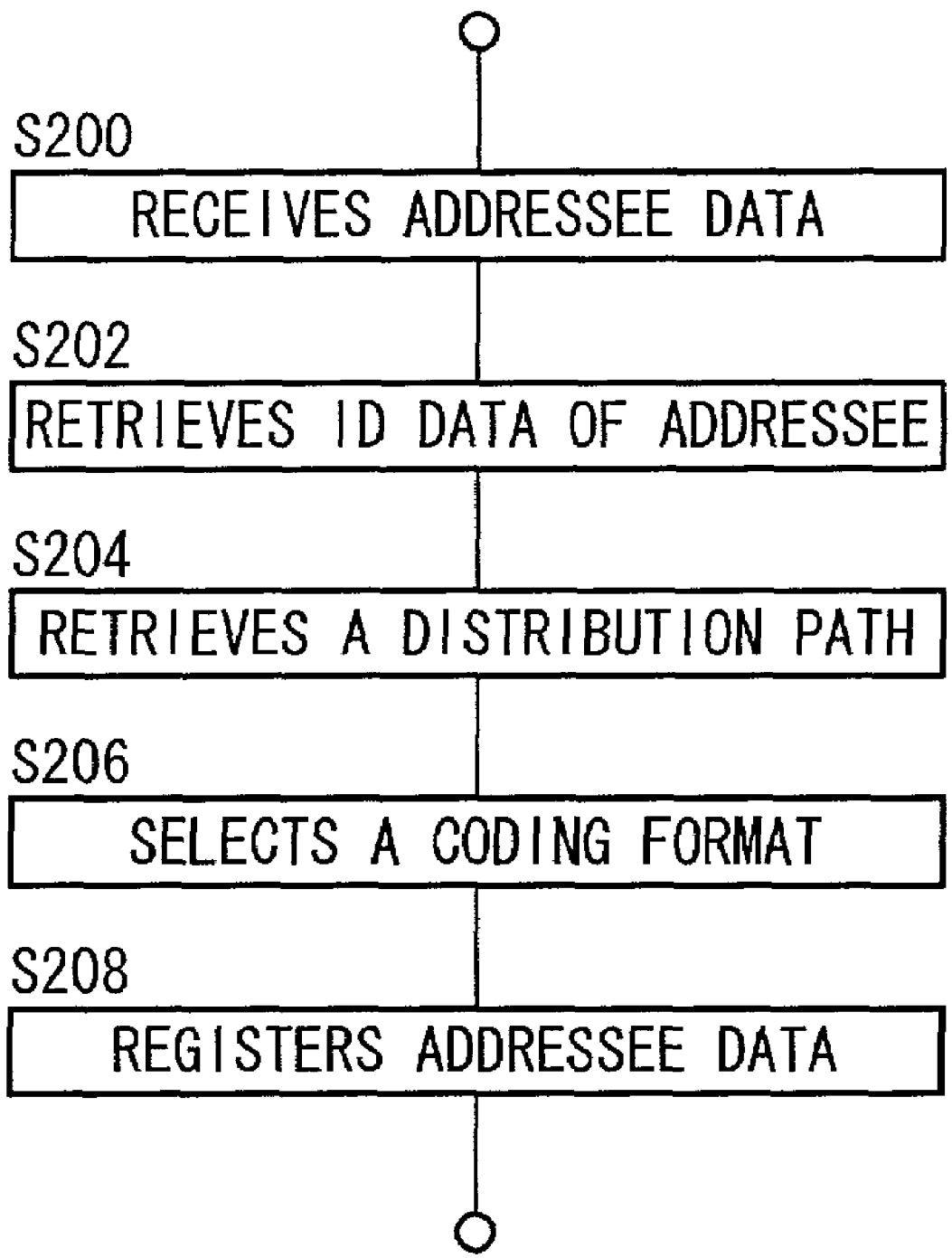
FIG. 7 is a flowchart showing the detailed operations of the distribution apparatus at the FIG. 6 registration step.

FIG. 7 is a flowchart showing the detailed operations of the distribution apparatus 90 at step S104 in FIG. 6. The addressee terminal data registration section 14 receives addressee terminal data from the data receiving unit 70, at step S200. The addressee terminal data registration section 14 then retrieves identification information of an addressee terminal from the addressee terminal data, at step S202. The addressee terminal data registration section 14 then retrieves data of distribution path from the addressee terminal data, at step S204. The format selecting section 32 then selects a coding format of distribution data that should be sent to an addressee terminal, based on the type of an addressee terminal and path data, which are received from the addressee terminal data registration section 14, at step S206. The format selecting section 32 then stores the coding data by matching with identification data of an addressee terminal, at step S208.

As described above, when identification data received by the data receiving unit 70 is not stored in the addressee terminal data table 36, the addressee terminal data registration section 14 registers the new received identification data to the addressee terminal data table 36. Therefore, even if the distribution apparatus 90 cannot obtain detailed data relating to an addressee terminal, such as the type of an addressee terminal, after getting a request to transmit digital contents, the format selecting section 32 can select a coding format to process digital contents that should be transmitted to an addressee terminal, based on the addressee terminal data table 36.

Figure 8:
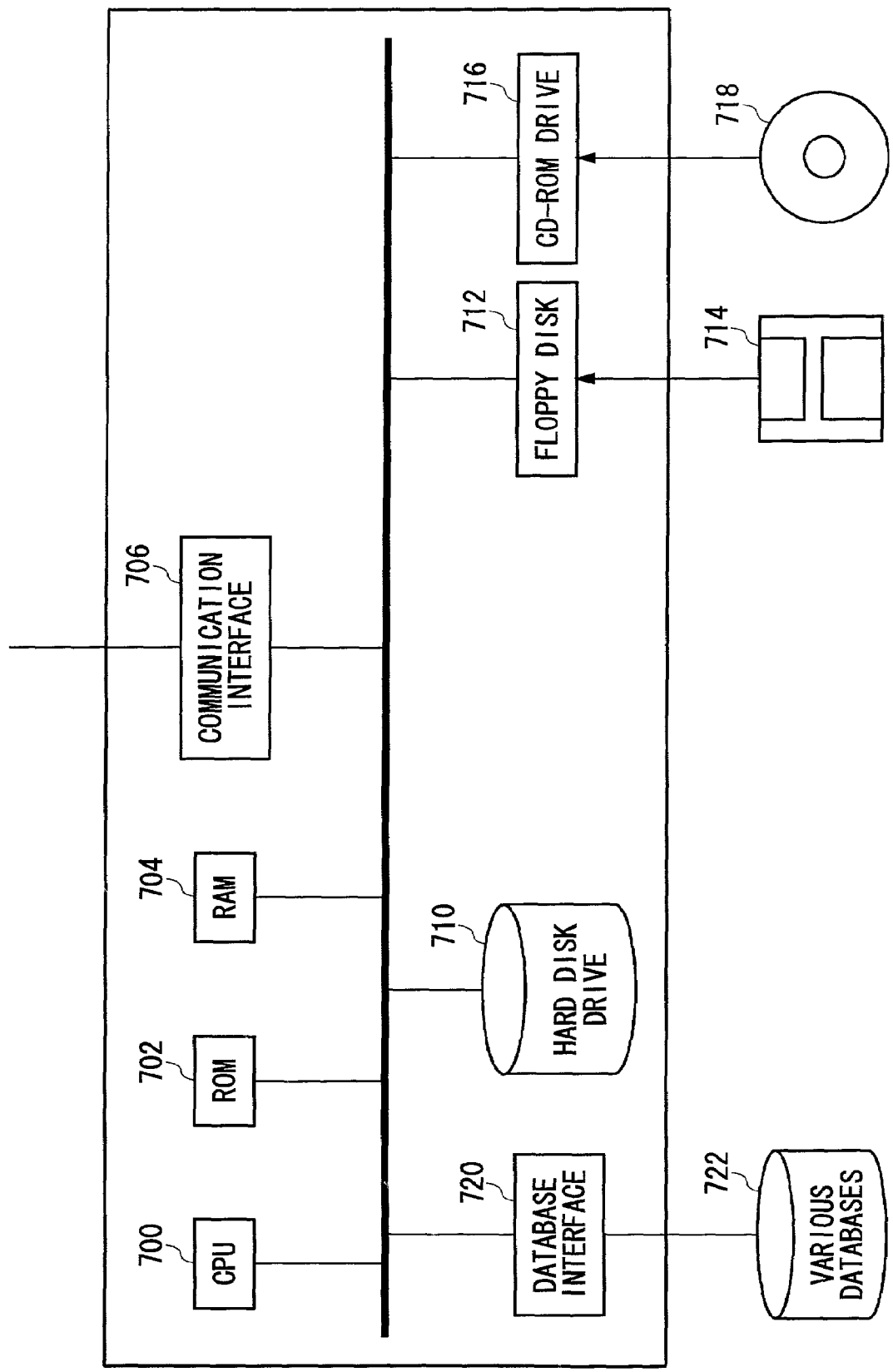
FIG. 8 is a diagram showing a hardware structure of the distribution apparatus according to the second embodiment.

FIG. 8 shows the hardware structure of the distribution apparatus 90 according to the second embodiment. The distribution apparatus 90 according to the first embodiment may be achieved by a multipurpose computer. The computer includes a CPU 700, a ROM disk 702, a RAM disk 704, a communication interface 706, and a database interface 720. The CPU 700 operates based on a program stored in the ROM disk 702 and the RAM disk 704. The communication interface 706 communicates with externals. The database interface 720 connects to various databases 722, writes data in the various databases 722, and updates the contents of the databases. A hard disk drive 710, as an example of a storage device, stores a program that operates setting data and the CPU 700.

A floppy disk drive 712 reads data or a program from a floppy disk 714 and provides the data or the program to the CPU 700. A CD-ROM drive 716 reads data or a program from a CD-ROM 718 and provides the data or the program to the CPU 700.

The software that the CPU 700 runs is stored in a recording medium, such as a floppy disk 714 or a CD-ROM 718, and is provided to users. The software stored in a recording medium may be compressed or non-compressed. Software is installed from a recording medium to the hard disk drive 710, is read on the RAM disk 704, and is run by the CPU 700.

Software that is stored in a recording media and is provided, that is, software that is installed in a hard disk drive 710, includes a data receiving module, a data registration module, an addressee terminal data managing module, a converting module, and a distribution module, as functional structures. Since the processes that each of these modules works with a computer and instructs the CPU 700 to undertake is the same as the functions and operations of corresponding units of the distribution apparatus 90 according to the first embodiment, respectively, the description will be omitted.

The floppy disk 714 or the CD-ROM 718 as an example of a recording medium as shown in FIG. 8 can store a part of operations or all of the functions of the distribution apparatus 90 according to the present embodiments described in the present application.

These programs may be run by reading directly from a recording media or may be run by reading onto a RAM disk after being temporarily installed on a hard disk drive. Further, the above programs may be stored in one recording media or be stored in a plurality of recording media. Moreover, these programs may be stored in a coded format.

An optical recording medium, such as a DVD; a magnetic recording medium, such as an MD; an optical magnetic recording medium, such as a PD; a tape medium; and a semiconductor memory, such as an IC card or a miniature card, may be used as a recording medium, other than a floppy disk and a CD-ROM. Further, a storage device, such as a hard disk or a RAM disk installed in a server system that is connected to a private communication network or the Internet, may be used as a recording medium. A program stored in the above recording medium may be provided to an insurance contracts processing apparatus through a communication network. Programs of this kind are used only for manufacturing an insurance contracts processing apparatus. Therefore, it is obvious that such manufacturing and selling of such a recording medium as a business constitute a patent infringement based on the present application.

Although the present invention has been described by way of exemplary embodiments, it should be understood that those skilled in the art might make many changes and substitutions without departing from the spirit and the scope of the present invention which is defined only by the appended claims.

As the first example for those changes, although the distribution apparatus 90 according to the present embodiments includes the format selecting table 34 and the coding format table 38, data stored in the format selecting table 34 and the coding format table 38 may be maintained in one table. That is, it is enough that a coding format of an encryption should be uniquely defined by matching with the type of an addressee terminal and a distribution path. Therefore, a table with a structure which achieves this correspondence will satisfy the object of the table.

As the second example for those changes, although the specific data field in the addressee terminal data table 36 according to the present embodiments stores data relating to digital contents that should be transmitted to an addressee terminal, data such as authors and owners of the digital contents may be stored by matching with digital contents stored in the contents storage unit 20, instead. In this case, the converting unit 40 may embed data, such as authors of digital contents, into the digital contents. Moreover, as another example for those changes, the digital contents stored in the contents storage unit 20 may be previously embedded with data relating to the digital contents.

As is obvious from the above description, distribution data converted by a different method depending on the type of an addressee terminal can be distributed, according to the present invention.

What is claimed is:

1. A distribution apparatus, which distributes digital contents to an addressee terminal, comprising:
   a contents storage unit, which stores said digital contents;
   a data receiving unit, which receives a type of said addressee terminal from a requester which is different than said addressee terminal and requests to distribute said digital contents;
   an addressee terminal data managing unit which selects a coding format for distribution data by referring to a format selecting table which includes an addressee terminal type field and a path data field;
   a converting unit, which converts said digital contents into said distribution data based on said type of said addressee terminal; and
   a distribution unit, which connects to said addressee terminal in a condition that said converting unit has completed converting said digital contents into said distribution data, said distribution unit distributing said distribution data to said addressee terminal,
   wherein said addressee terminal data managing unit manages a format of distribution data for said addressee terminal by matching said type of said addressee terminal with one of a plurality of types of addressee terminals, and selects said coding format of said distribution data for said addressee terminal based on said type of said addressee terminal received by said data receiving unit,
   wherein said converting unit converts said digital contents into said distribution data of said format selected by said addressee terminal data managing unit,
   wherein said addressee terminal data managing unit manages a degree of encryption for said addressee terminal with said format of said distribution data, and
   wherein said converting unit converts said digital contents into said distribution data of said encryption selected by said addressee terminal data managing unit.

2. The distribution apparatus as claimed in claim 1, wherein said data receiving unit receives said type of said addressee terminal from a provider of said digital contents.

3. The distribution apparatus as claimed in claim 1, wherein said addressee terminal data managing unit selects said encryption which can be decoded at said addressee terminal.

4. The distribution apparatus as claimed in claim 1, wherein:
   said data receiving unit receives from said requester, path data relating to a distribution path to said addressee terminal;
   said addressee terminal data managing unit manages data relating to a safety of said distribution path to said addressee terminal; and
   said converting unit encrypts said digital contents with an intensity according to the safety.

5. The distribution apparatus as claimed in claim 4, wherein:
   said data receiving unit receives from said requester, said path data relating to said distribution path to said addressee terminal;
   said addressee terminal data managing unit selects whether or not to embed a digital watermarking into said distribution data, based on said path data; and
   said converting unit embeds said digital watermarking into said distribution data when said addressee terminal data managing unit selects to embed said digital watermarking.

6. The distribution apparatus as claimed in claim 5, wherein:
   said data receiving unit further receives identification data for identifying said addressee terminal from said requester;
   said addressee terminal data managing unit further includes an addressee terminal data table, which matches identification data for identifying said addressee terminal with said type of said addressee terminal;
   said data receiving unit receives from said requester, said identification data of said addressee terminal and said type of said addressee terminal when said identification data is not stored in said addressee terminal data table; and
   said addressee terminal data table stores said type by matching with said identification data.

7. The distribution apparatus as claimed in claim 6, wherein said addressee terminal data managing unit detects a computational power of said addressee terminal based on said type of said addressee terminal received by said data receiving unit, and selects said type based on said computational power.

8. The distribution apparatus as claimed in claim 7, wherein said addressee terminal data managing unit judges a data redistributing ability of said addressee terminal based on said type of said addressee terminal received by said data receiving unit and selects said type based on said data redistributing ability.

9. The distribution apparatus as claimed in claim 8, wherein:
   said addressee terminal data managing unit manages data relating to said computational power of said addressee terminal; and
   said converting unit encrypts said digital contents with said intensity according to said computational power of said terminal.

10. The distribution apparatus as claimed in claim 9, wherein said addressee terminal data managing unit selects said type based on a credibility of said addressee terminal.

11. The distribution apparatus as claimed in claim 10, wherein:
   said addressee terminal data managing unit judges said data redistributing ability of said addressee terminal based on said type of said addressee terminal received by said data receiving unit and further manages specific data, which is specific to said data redistributing ability of said addressee terminal; and
   said converting unit embeds said specific data into said distribution data according to said data redistributing ability of said addressee terminal.

12. The distribution apparatus as claimed in claim 11, wherein:
   said addressee terminal data managing unit further manages specific data, which is specific to said credibility of said addressee terminal; and
   said converting unit embeds said specific data into said distribution data according to said credibility of said addressee terminal.

13. The distribution apparatus as claimed in claim 12, wherein:

said addressee terminal data table further stores specific hardware data, which is specific to hardware of each addressee terminal; and
said converting unit embeds said specific hardware data into said distribution data.

14. The distribution apparatus as claimed in claim 13, wherein:
said addressee terminal data table further stores specific software data, which is specific to software of a program for viewing said digital contents on each addressee terminal; and
said converting unit embeds said specific software data into said distribution data.

15. The distribution apparatus as claimed in claim 14, wherein said addressee terminal data managing unit selects said type based on a data format, which is decoded by said addressee terminal.

16. A distribution method for distributing digital contents as distribution data of a certain format, comprising:
judging and selecting addressee terminal data of an addressee terminal based on data previously received from said addressee terminal, said judging and selecting being initiated by a distributor;
selecting a coding format for said distribution data by using an addressee terminal data managing unit which refers to a format selecting table which includes an addressee terminal type field and a path data field;
converting said digital contents into said distribution data by using a converting unit with a method based on said addressee terminal data;
storing said distribution data differently for every said addressee terminal; and
distributing said distribution data stored for said addressee terminal to a desired addressee terminal,
wherein said addressee terminal data managing unit manages a format of distribution data for said addressee terminal by matching a type of said addressee terminal with one of a plurality of types of addressee terminals, and selects said coding format of said distribution data for said addressee terminal based on said addressee terminal data,
wherein said converting unit converts said digital contents into said distribution data of said format selected by said addressee terminal data managing unit,
wherein said addressee terminal data managing unit manages a degree of encryption for said addressee terminal with said format of said distribution data, and
wherein said converting unit converts said digital contents into said distribution data of said encryption selected by said addressee terminal data managing unit.

17. A contents distribution method, which distributes digital contents to an addressee terminal, comprising:
receiving data of a type of said addressee terminal from a requester which is different than said addressee terminal, and which requests to distribute said digital contents;
selecting a coding format for distribution data by using an addressee terminal data managing unit which refers to a format selecting table which includes an addressee terminal type field and a path data field;
converting said digital contents into said distribution data based on said type by using a converting unit;
connecting to said addressee terminal in a condition that said converting to said distribution data has completed distributing said distribution data; and
distributing said distribution data to said addressee terminal,
wherein said addressee terminal data managing unit manages a format of distribution data for said addressee terminal by matching said type of said addressee terminal with one of a plurality of types of addressee terminals, and selects said coding format of said distribution data for said addressee terminal based on said type of said addressee terminal,
wherein said converting unit converts said digital contents into said distribution data of said format selected by said addressee terminal data managing unit,
wherein said addressee terminal data managing unit manages a degree of encryption for said addressee terminal with said format of said distribution data, and
wherein said converting unit converts said digital contents into said distribution data of said encryption selected by said addressee terminal data managing unit.

18. A recording medium, which stores a program for a distribution apparatus to distribute digital contents to an addressee terminal, comprising:
a data receiving module, which receives a type of said addressee terminal from a requester which is different than said addresser, and which requests to distribute said digital contents;
an addressee terminal data managing module, which selects selecting a coding format for distribution data by referring to a format selecting table which includes an addressee terminal type field and a path data field;
a converting module, which converts said digital contents into said distribution data based on said type; and
a distribution module, which connects to said addressee terminal in a condition that said converting module has completed converting said digital data into said distribution data and distributes said distribution data to said addressee terminal,
wherein said addressee terminal data managing module manages a format of distribution data for said addressee terminal by matching said type of said addressee terminal with one of a plurality of types of addressee terminals, and selects said coding format of said distribution data for said addressee terminal based on said type of said addressee terminal received by said data receiving module,
wherein said converting module converts said digital contents into said distribution data of said format selected by said addressee terminal data managing module,
wherein said addressee terminal data managing module manages a degree of encryption for said addressee terminal with said format of said distribution data, and
wherein said converting module converts said digital contents into said distribution data of said encryption selected by said addressee terminal data managing module.

19. A distribution apparatus as claimed in claim 1, wherein said distribution unit distributes said distribution data upon a request from said addressee terminal.

20. A distribution method as claimed in claim 16, wherein said distributing comprises distributing said distribution data upon a request from said addressee terminal.

21. A contents distribution method as claimed in claim 17, wherein said distributing comprises distributing said distribution data upon a request from said addressee terminal.

22. A recording medium as claimed in claim 18, wherein said distribution module distributes said distribution data upon a request from said addressee terminal.

23. The distribution apparatus as claimed in claim 1, wherein said type of said addressee terminal comprises one of a computer terminal, storefront terminal, portable terminal, cellular phone terminal, game machine terminal and satellite terminal.

24. The distribution apparatus as claimed in claim 1, wherein said addressee terminal data managing unit selects said coding format by comparing said type of addressee terminal to a plurality of types of addressee terminals stored in said format selecting table.

25. The distribution apparatus as claimed in claim 24, wherein said format selecting table further comprises a redistribution power field which indicates an ability of said plurality of types of addressee terminals to further distribute said distribution data.

26. The distribution apparatus as claimed in claim 24, wherein said format selecting table further comprises at least one of a computational power field, a credibility field, a usable data field and a coding ID field.

27. The distribution apparatus as claimed in claim 1, wherein said addressee terminal data managing unit stores identification data for said addressee terminal and associated data relating to said addressee terminal in an addressee terminal data table, said associated data comprising said coding format for said addressee terminal.

28. The distribution apparatus as claimed in claim 27, wherein said associated data further comprises one of hardware data for said addressee terminal and software data for said addressee terminal.

29. The distribution apparatus as claimed in claim 27, wherein said identification data comprises one of an e-mail address for said addressee terminal and a telephone number for said addressee terminal.

* * * * *